(12) United States Patent
Perich et al.

(10) Patent No.: US 11,292,606 B1
(45) Date of Patent: Apr. 5, 2022

(54) SYSTEMS AND METHODS OF AIRSPEED CONTROL WITH DYNAMIC ASYMMETRIC AIRSPEED REFERENCE

(71) Applicant: Rockwell Collins, Inc., Cedar Rapids, IA (US)

(72) Inventors: John P. Perich, Marion, IA (US); Samuel E. Ferdon, Hiawatha, IA (US); Cornelis Van Der Linden, Marion, IA (US); Thomas M. Scanlon, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 91 days.

(21) Appl. No.: 16/130,259

(22) Filed: Sep. 13, 2018

(51) Int. Cl.
*B64D 31/06* (2006.01)
*G05B 19/416* (2006.01)

(52) U.S. Cl.
CPC .......... *B64D 31/06* (2013.01); *G05B 19/416* (2013.01); *G05B 2219/42339* (2013.01)

(58) Field of Classification Search
CPC .................. B64D 31/06; G05B 19/416; G05B 2219/42339
USPC ............................................................ 701/7
See application file for complete search history.

(56) References Cited

U.S. PATENT DOCUMENTS

| | | | | |
|---|---|---|---|---|
| 2006/0253230 A1* | 11/2006 | Fanciullo | ............. | G05D 1/0202 701/3 |
| 2008/0125930 A1* | 5/2008 | Johnson | .................... | F02C 9/42 701/9 |
| 2008/0308682 A1* | 12/2008 | Builta | .................. | G05D 1/0615 244/182 |
| 2009/0192634 A1* | 7/2009 | Fujinaka | .............. | G05B 13/021 700/42 |
| 2016/0052715 A1* | 2/2016 | Ogden | ................... | G06Q 10/08 700/216 |
| 2017/0153634 A1* | 6/2017 | Koga | .................... | G05B 19/416 |
| 2018/0130198 A1* | 5/2018 | Kikuchi | ................. | G01K 11/12 |

* cited by examiner

*Primary Examiner* — Geepy Pe
*Assistant Examiner* — Bakari Underwood
(74) *Attorney, Agent, or Firm* — Suiter Swantz pc llo (57) ABSTRACT

A system for an airborne platform includes a sensing device, an automatic throttling system, and a processing circuit. The sensing device is configured to measure a current airspeed of an aircraft. The processing circuit is configured to receive a control input comprising a current airspeed value, an airspeed reference value, a maximum adder threshold, and a minimum adder threshold. The processing circuit is further configured to calculate an airspeed error value based on the control input. The processing circuit is further configured to determine a programmed error value based on the calculated airspeed error value. The processing circuit is further configured to calculate an adder value by applying an integration function to the determined programmed error value and to determine a dynamic airspeed reference value based on the calculated adder value. The processing circuit is further configured to transmit the dynamic airspeed reference value to the automatic throttling system.

19 Claims, 4 Drawing Sheets

SYSTEMS AND METHODS OF AIRSPEED CONTROL WITH DYNAMIC ASYMMETRIC AIRSPEED REFERENCE

BACKGROUND

The inventive concepts disclosed herein relate generally to the field of aircraft control systems. More particularly, embodiments of the inventive concepts disclosed herein relate to determining an airspeed reference value including but not limited to a dynamic airspeed reference value of an aircraft control system.

Prior to beginning a landing approach, an aircraft operator will often calculate a reference speed for the approach. The reference speed may be used as an input for an automatic throttling system of the aircraft. The reference speed may vary based on aircraft properties, such as weight, flap configuration, etc. During this process, the aircraft operator utilizes a weather report, such as a Meteorological Terminal Aviation Routine Weather Report (METAR), to determine if the reference speed should be adjusted due to winds and other weather conditions. For example, the aircraft operator may adjust the reference speed by nominally increasing the original value, and the aircraft operator may use the adjusted reference speed for the approach.

However, the adjusted reference speed may not be accurate when actual weather conditions are not as reported. For example, winds may suddenly increase or turbulence may occur due to thermal activity during hot days. When automation is involved, the aircraft operator may need to manually update the reference speed or takeover control. This adjustment is arbitrary and may not optimum. Further, conditions may subsequently change later in the approach.

SUMMARY

In one aspect, the inventive concepts disclosed herein are directed to a method. The method includes receiving, by a processing circuit, a control input comprising a current airspeed value, an airspeed reference value, a maximum adder threshold, and a minimum adder threshold. The method further includes calculating, by the processing circuit, an airspeed error value based on the control input. The method further includes determining, by the processing circuit, a programmed error value based on the airspeed error value. The method further includes calculating, by the processing circuit, an adder value by applying an integration function to the determined programmed error value. The method further includes determining, by the processing circuit, a dynamic airspeed reference value based on the adder value, the dynamic airspeed reference value being related to a combination (e.g., a sum) of the airspeed error value and the adder value.

In a further aspect, the inventive concepts disclosed herein are directed to a system. The system includes an automatic throttling system and a sensing device provided with an airborne platform and configured to measure a current airspeed. The system further includes a processing circuit having a processor and a memory, and the processing circuit is communicably coupled to the sensing device and to the automatic throttling system. The processing circuit is configured to receive a control input comprising a current airspeed value measured by the sensing device, an airspeed reference value, a maximum adder threshold, and a minimum adder threshold. The processing circuit is further configured to calculate an airspeed error value based on the control input. The processing circuit is further configured to determine a programmed error value based on the calculated airspeed error value. The processing circuit is further configured to calculate an adder value by applying an integration function to the determined programmed error value. The processing circuit is further configured to determine a dynamic airspeed reference value based on the calculated adder value, and the dynamic airspeed reference value is calculated using the airspeed error value and the adder value. The processing circuit is further configured to transmit the dynamic airspeed reference value to the automatic throttling system.

In a further aspect, the inventive concepts disclosed herein are directed to a processing circuit having a processor and a memory. The processing circuit is configured to receive a control input comprising a current airspeed value, an airspeed reference value, a maximum adder threshold, and a minimum adder threshold. The processing circuit is further configured to calculate an airspeed error value based on the control input. The processing circuit is further configured to determine a programmed error value based on the calculated airspeed error value. The processing circuit is further configured to calculate an adder value by applying an integration function to the determined programmed error value. The processing circuit is further configured to determine a dynamic airspeed reference value based on the calculated adder value, the dynamic airspeed reference value being equal to a sum of the airspeed error value and the adder value. In some embodiments, the processing circuit is further configured to transmit the determined dynamic airspeed reference value to an automatic throttling system.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein, a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B is true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

As used herein, any reference to "one embodiment" or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination or sub-combination of two or more such features, along with any other features which may not necessarily be expressly described or inherently present in the instant disclosure.

The inventive concepts disclosed herein can be utilized in a number of control systems for various types of applications. While the present disclosure describes systems and methods implementable in an aircraft, the inventive concepts disclosed herein may be used in any type of environment (e.g., in another aircraft, a spacecraft, a ground-based vehicle, drone, a simulator, or in a vehicle or non-vehicle application such as a ground-based display system, an air traffic control system, a radar system, a drone control system, or a virtual display system). While certain examples and embodiments of the inventive concepts disclosed herein are described with respect to a pilot of an aircraft, it will be appreciated that users other than a pilot may use and benefit from some inventive concepts disclosed herein with respect to other vehicles and/or objects.

Broadly, embodiments of the inventive concepts disclosed herein are directed to determining a dynamic airspeed reference value of an aircraft, for example for a landing approach process. In some embodiments, the determined dynamic airspeed reference value is used for minimizing error between an airspeed setpoint (e.g., an airspeed reference value) and an actual airspeed of an aircraft. A processing circuit can be configured to receive various inputs, including the setpoint and actual airspeed, to determine and output the dynamic airspeed reference value to an automatic throttle control system.

In current and existing systems, a pilot or an aircraft operator will often calculate a reference speed for a landing approach prior to beginning the approach. The reference speed represents a desirable reference speed and may be used as a setpoint for an automatic throttling system of the aircraft. The reference speed may vary based on aircraft properties, such as weight, flap configuration, etc. The pilot manually adjusts an airspeed reference value, for example due to changing weather conditions. Pilots are generally more comfortable flying the aircraft above the computed reference than right on it because the airspeed reference used for an autothrottle system is generally computed to be as low as possible to improve landing performance. A pilot may nominally increase the airspeed reference value to ensure the aircraft does not decelerate below the airspeed reference value, but this adjustment is often arbitrary and may not be optimum at the moment or later in the approach.

In some embodiments, systems and methods disclosed herein include a processing circuit configured to determine and output a dynamic airspeed reference value having asymmetric characteristics. In some embodiments, the processing circuit is configured with an error programmer module configured to generate a programmed error value having asymmetric and/or non-linear output characteristics that facilitates biasing the dynamic airspeed reference value above the initial setpoint. Furthermore, some embodiments may include an integrator configured to generate an adder value using one or more thresholds that biases the dynamic airspeed reference value above the initial setpoint. Some embodiments of systems and methods disclosed herein improve current and existing systems by reducing the steps of a pilot during the pre-approach phase of flight and removing potential for erroneous input by the pilot. In various implementations, systems and methods can be configured to adapt the airspeed reference used by the automatic throttle control to real-time conditions as the approach is flown, for example based on various environmental variables.

Figure 1:
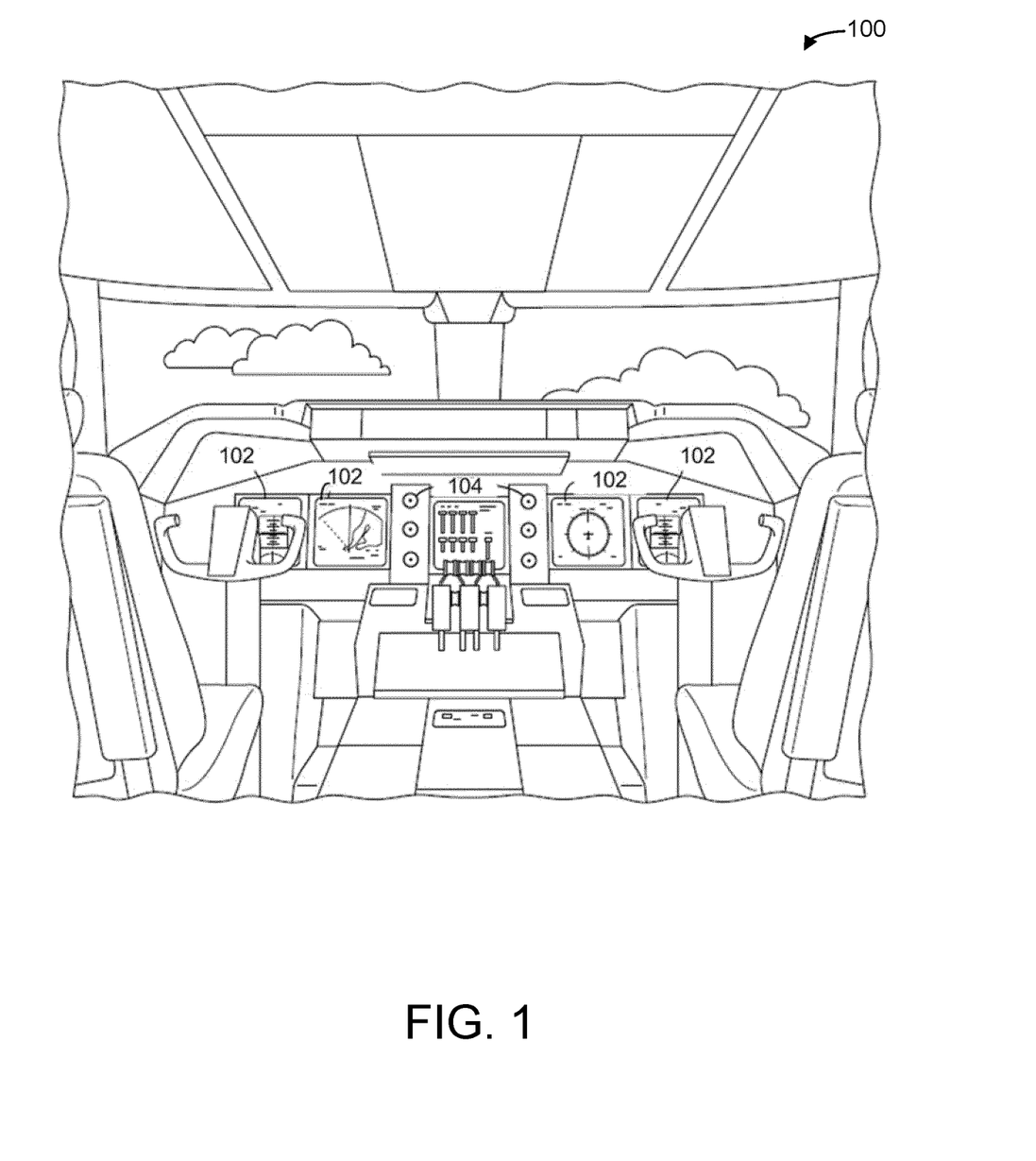
FIG. 1 is a schematic illustration of an exemplary embodiment of a control center of an aircraft, according to the inventive concepts disclosed herein.

Referring now to FIG. 1, a schematic illustration of an exemplary embodiment of a control center of an aircraft is shown according to some inventive concepts disclosed herein. The aircraft control center 100 (or "cockpit") includes one or more flight displays 102 and one or more user interface (UI) elements 104. The flight displays 102 may be implemented using any of a variety of display technologies, including CRT, LCD, organic LED, dot matrix display, and others. The flight displays 102 may be navigation (NAV) displays, primary flight displays, electronic flight bag displays, tablets such as iPad® computers manufactured by Apple, Inc. or tablet computers, synthetic vision system displays, head up displays (HUDs) with or without a projector, wearable displays, watches, Google Glass® and so on. The flight displays 102 may be used to provide information to the flight crew, thereby increasing the flight crew's visual range and enhancing their decision-making abilities. The flight displays 102 may be configured to function as, for example, a primary flight display (PFD) used to display altitude, airspeed, vertical speed, navigation and traffic collision avoidance system (TCAS) advisories; a crew alert system (CAS) configured to provide alerts to the flight crew; a multi-function display used to display navigation maps, weather radar, electronic charts, TCAS traffic, aircraft maintenance data and electronic checklists, manuals, and procedures; an engine indicating and crew-alerting system (EICAS) display used to display critical engine and system status data, and so on. Other types and functions of the flight displays 102 are contemplated and will be apparent to those skilled in the art.

In some embodiments, the flight displays 102 provide an output from an aircraft-based system, a ground-based system, a satellite-based system, or from a system of another aircraft. In some embodiments, the flight displays 102 provide an output from an aircraft-based weather radar system, LIDAR system, infrared system or other system on the aircraft. For example, the flight displays 102 may include an avionics display, a joint display, an air traffic display, a weather radar map, and a terrain display. The flight displays 102 include an electronic display or a synthetic vision system (SVS). For example, the flight displays 102 may include a display configured to display a two-dimensional (2-D) image, a three-dimensional (3-D) perspective image, or a four-dimensional (4-D) display. Other views of air traffic information, terrain, and/or weather information may also be provided (e.g., plan view, horizontal view, and vertical view). The views shown on the flight displays 102 may include monochrome or color graphical representations of the displayed information, which may include an indication of altitude of other aircraft, weather conditions, or terrain, or the altitude and/or location of such information relative to the aircraft.

The UI elements 104 may include, for example, dials, switches, buttons, touch screens, keyboards, a mouse, joysticks, cursor control devices (CCDs) or other multi-function key pads certified for use with avionics systems. The UI elements 104 may be configured to, for example, allow one or more aircraft crew members to interact with various avionics applications and perform functions such as data entry, manipulation of navigational maps, and moving among and selecting checklist items. In some embodiments, the UI elements 104 may be used to provide a user input for adjusting one or more aircraft controls and/or a setting for configuring an aircraft control. For example, the UI elements 104 may be configured to receive an input relating to a desired airspeed, such as an airspeed reference value, threshold values, and the like. In this regard, the user input may be stored in a memory or data storage in some embodiments. The UI elements 104 may also (or alternatively) be used by an aircraft crew member to interface with or manipulate the displays of the flight displays 102. For example, the UI elements 104 may be used by an aircraft crew member to adjust the brightness, contrast, and information displayed on the flight displays 102. The UI elements 104 may additionally be used to acknowledge or dismiss an indicator provided by the flight displays 102. Further, the UI elements 104 may be used to correct errors on the flight displays 102. Other UI elements 104, such as indicator lights, displays, display elements, and audio alerting devices, may be configured to warn of potentially threatening conditions such as severe weather, terrain, and obstacles.

Figure 2:
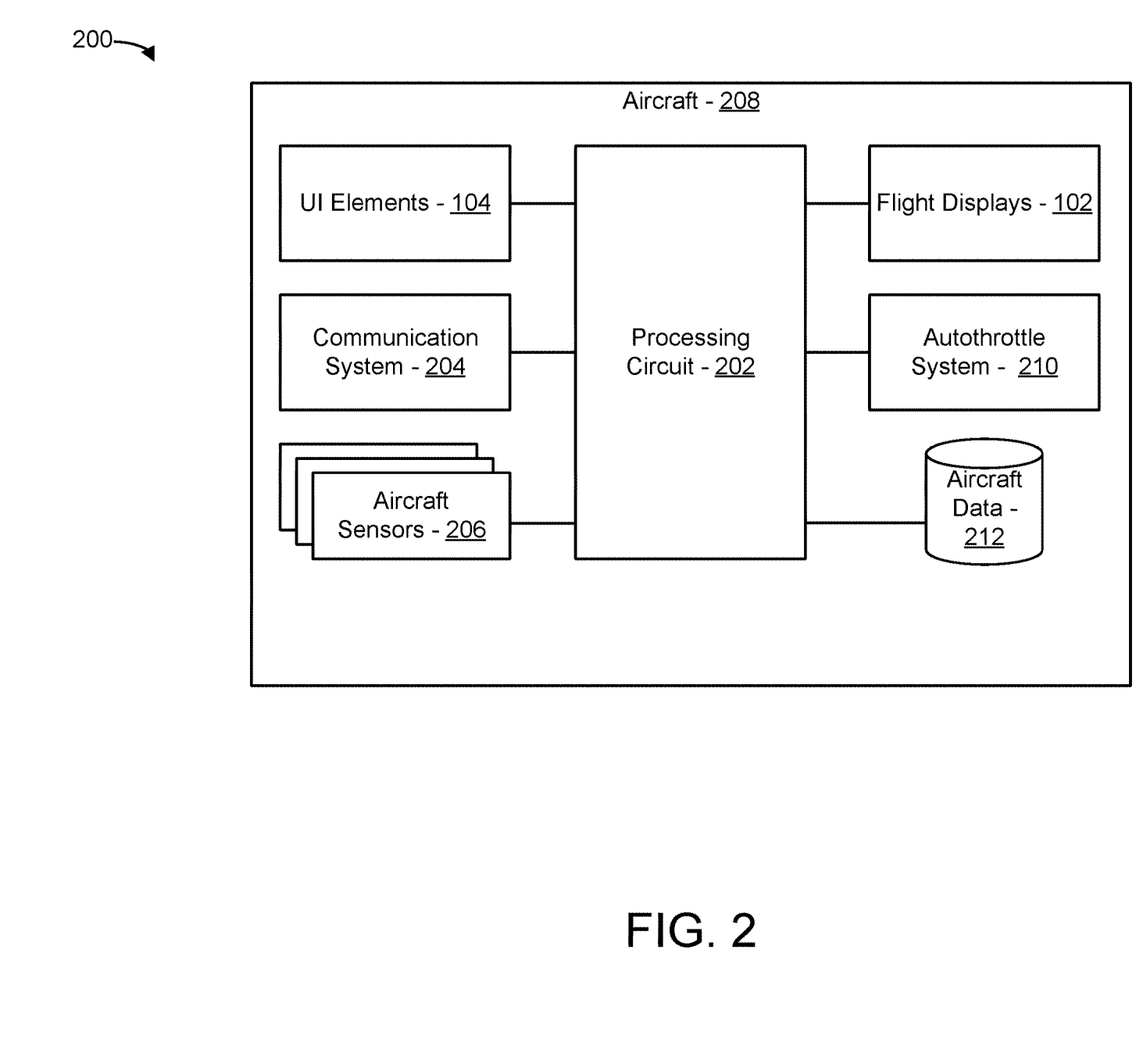
FIG. 2 is a schematic block diagram of a system configured to determine a dynamic airspeed reference value for the control system illustrated in FIG. 1, according to the inventive concepts disclosed herein.

Referring now to FIG. 2, a system 200 configured to determine a dynamic airspeed reference value is shown according to some inventive concepts disclosed herein. The system 200 is shown to include a processing circuit 202, the flight displays 102, the UI elements 104, a communication system 204, a plurality of aircraft sensors 206, an autothrottle system 210, and an aircraft data database 212 that may be provided in an airborne platform (e.g., an aircraft). In some embodiments, one or more of the processing circuit 202, the flight displays 102, the UI elements 104, the communication system 204, the plurality of aircraft sensors 206, the autothrottle system 210, and aircraft data database 212 is provided external to the aircraft. In some embodiments, the system 200 includes other systems and components for general aircraft operation, such as a weather radar system. The system 200 is part of the aircraft control center 100 (FIG. 1) in some embodiments.

The processing circuit 202 is configured to send data to and receive data from, or otherwise facilitate electronic data communications, with the other systems of the system 200 or with remote systems such as satellite-based systems or ground-based systems in some embodiments. The processing circuit 202 interfaces with an aircraft control system, aircraft monitoring system, or other such system in some embodiments. The processing circuit 202 is generally configured to receive input from any such systems to determine a dynamic airspeed reference value in some embodiments. In this regard, the processing circuit 202 may be configured to use a proportion function, an integral function, and/or a derivative function to determine the dynamic airspeed reference value. In some embodiments, the dynamic airspeed reference value is provided as an output to the autothrottle system 210, which can be any suitable automatic throttling system. In some embodiments, the processing circuit 202 is partially or completely provided in a flight management system of the aircraft 208. In some embodiments, the dynamic airspeed reference value is displayed to the user via the flight displays 102. The structure and processes of the processing circuit 202 is shown in greater detail in FIG. 3 and FIG. 4.

The aircraft data database 212 is configured to store data for determining a dynamic reference value in some embodiments. In this regard, the processing circuit 202 can be configured to selectively transmit data for storage and retrieve stored data. For example, the aircraft data database 212 may be configured to store historical flight data, such as data relating to a time series of airspeed values. In this regard, the stored airspeed data includes measured airspeed values at repeating time intervals in some embodiments. The processing circuit 202 is configured to retrieve a measured airspeed from the aircraft sensors 206 at a predetermined frequency (e.g., 0.1 Hz, 1 Hz) and transmit each measured airspeed value with a time value to the aircraft data database 212 in some embodiments. In some embodiments, the aircraft data database 212 is configured to store data relating to one or more user inputs as described herein. In some embodiments, the aircraft data database 212 is configured to store a control law, a look-up table, and other information to facilitate determining a dynamic reference value. In some embodiments, the aircraft data database 212 is partially or completely provided within the processing circuit 202 (e.g., in the memory 304).

In some embodiments, data stored by the aircraft data database 212 may vary, for example, according to a particular implementation, preferences, etc. For example, the aircraft data database 212 may be configured to store one or more preset or predetermined values, such as a maximum adder threshold value and a minimum adder threshold value as described with reference to FIG. 3. In this regard, the aircraft data database 212 may be configured to store information as hard-coded data that may not be altered by an aircraft operator. Additionally or alternatively, the aircraft data database 212 may be configured to store maximum adder threshold and minimum adder threshold values that are provided and/or adjusted by an aircraft operator (e.g., via the UI elements 104).

In some embodiments, the aircraft data database 212 may be configured to store one or more calculated values. For example, the processing circuit 202 may be configured to calculate an airspeed reference value based on characteristics of the aircraft 208 (e.g., a weight of the aircraft 208, speed, altitude, etc.) and store the calculated airspeed reference value in the aircraft data database 212. In some embodiments, the airspeed reference value is calculated by a flight management system and subsequently stored in the aircraft data database 212.

The communication system 204 is configured to facilitate communications between the processing circuit 202 and one or more external systems in some embodiments. For example, the communication system 204 can be configured to send data to and receive data from external ground-based weather supplier systems and ground-based air traffic control systems. The communication system 204 can be configured to communicate with any system, internal or external to the aircraft, such as a satellite system, other aircraft, a terrestrial station, or other air, space, or ground-based system. It should be understood that the information received by the processing circuit 202 as described in the present disclosure can come from any internal or external source. The communication system 204 can be configured to communicate with external systems using any type of communication protocol or network (e.g., via a mobile network, via one or more bi-directional or uni-directional communication channels) and can include any type of wired or wireless interface for facilitating the communication.

In some embodiments, the communication system 204 is communicably coupled to a flight monitoring system (not shown) configured to acquire flight data indicative of one or more aircraft performance characteristics. The performance characteristics can relate to speed (e.g., indicated airspeed, a true airspeed, groundspeed), acceleration, a pitch angle, a flight path angle, a flap position, a thruster setting, altitude, and/or rate of descent of the aircraft. The flight monitoring system can include at least one of a GPS, a Global Navigation Satellite System (GNSS), an altitude heading and reference system (AHRS), and an inertial reference system (IRS).

The aircraft sensors 206 may include, for example, one or more devices or instruments configured for tracking airspeed (e.g., pitot-static system) and/or location (e.g., GPS). In some embodiments, the aircraft sensors 206 include fuel sensors, turbulence sensors, pressure sensors, optical systems (e.g., camera system, infrared system), weather sensors, such as outside air temperature sensors, winds at altitude sensors, INS G load (in-situ turbulence) sensors, barometric pressure sensors, humidity sensors, or any other aircraft sensors or sensing system that may be used to monitor the performance of an aircraft or weather local to or remote from the aircraft. The aircraft sensors 206 may include one or more sensors configured to acquire data indicative of speed (e.g., indicated airspeed, a true airspeed, and groundspeed), an angle of attack, a pitch angle, a flight path angle, an acceleration, a rate of descent, and/or an altitude. The aircraft sensors 206 may be located in various positions on the aircraft, and a single sensor may be configured to acquire more than one type of sensor data. Data from the aircraft sensors 206 may be output to the processing circuit 202, the communication system 204, the flight displays 102, the autothrottle system 210, and/or a flight monitoring system (not shown) as described herein.

Figure 3:
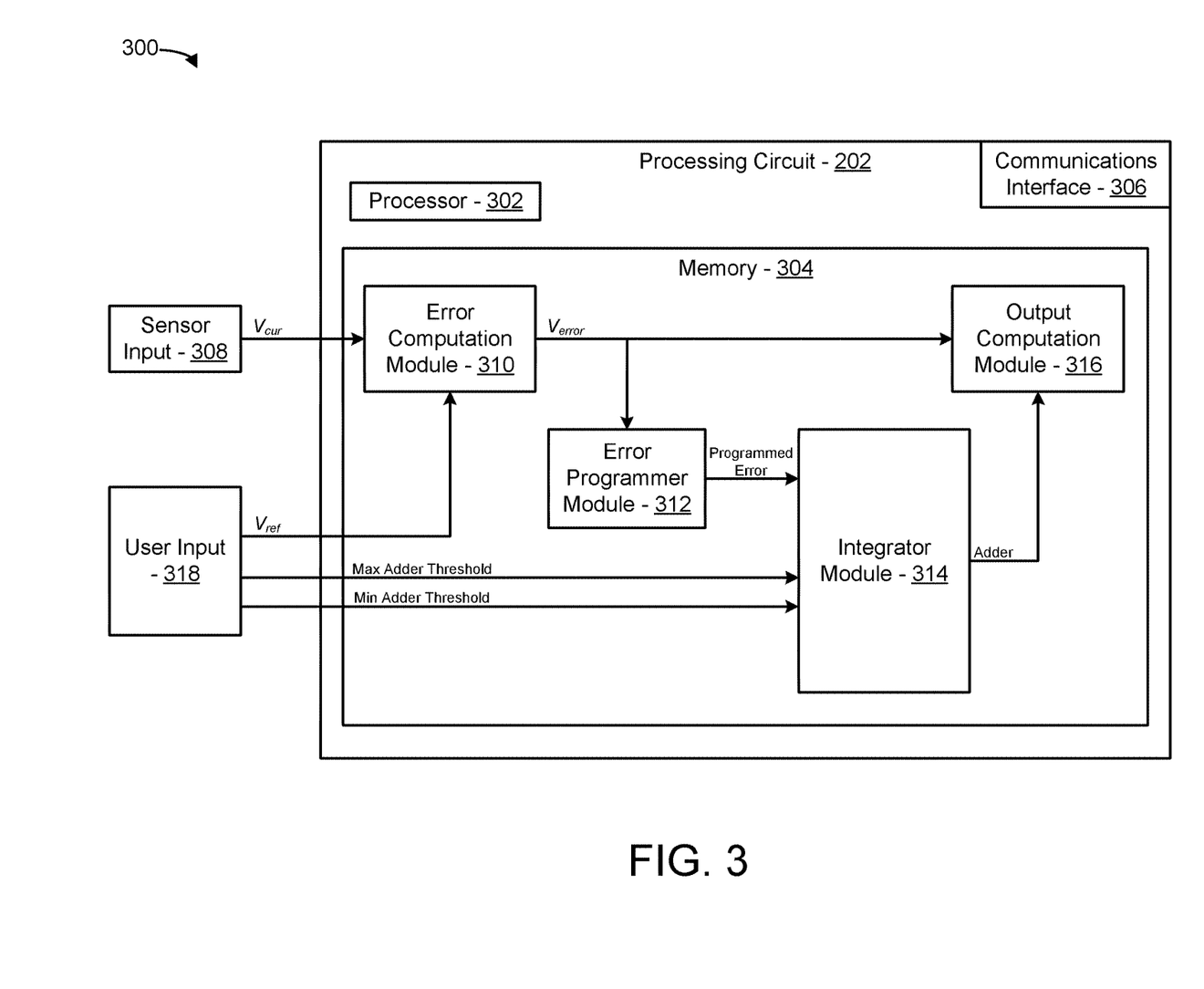
FIG. 3 is a schematic block diagram of the processing circuit of the system configured to determine a dynamic airspeed reference value illustrated in FIG. 2, according to the inventive concepts disclosed herein.

Referring to FIG. 3, a block diagram of the processing circuit 202 configured to determine a dynamic airspeed reference value is shown in further detail according to some inventive concepts disclosed herein. The processing circuit 202 is shown to include a processor 302, a memory 304, and a communications interface 306. The communications interface 306 can be a wired or wireless interface configured to facilitate communications between the processing circuit 202 and the other components and systems of the system 200. The processor 302 can be implemented as a general or specific purpose processor, an application specific integrated circuit (ASIC), one or more field programmable gate arrays (FPGAs), a group of processing components, or other suitable electronic processing components.

The memory 304 is one or more devices (e.g., RAM, ROM, flash memory, hard disk storage) for storing data and computer code for completing and facilitating the various user or client processes, layers, and modules described in the present disclosure. The memory 304 may be or include volatile memory or non-volatile memory and may include database components, object code components, script components, or any other type of information structure for supporting the various activities and information structures of some inventive concepts disclosed herein. The memory 304 is communicably connected to the processor 302 and includes computer code or instruction modules for executing one or more processes described herein. The memory 304 can include various circuits, software engines, and/or modules that cause the processor 302 to execute the systems and methods described herein. In some embodiments, the processing circuit 202 also includes a graphics processing unit (GPU) (not shown), which can be configured to retrieve electronic instructions for generating a visual representation for one or more of the flight displays 102 and execute the electronic instructions in order to generate the visual representation.

The memory 304 is shown to include an error computation module 310, an error programmer module 312, an integrator module 314, and an output computation module 316. In some embodiments, the error computation module 310, the error programmer module 312, the integrator module 314, and the output computation module 316 are embodied as machine or computer-readable media that is executable by a processor, such as the processor 302. As described herein and amongst other uses, the machine-readable media facilitates performance of certain operations to enable determining a dynamic airspeed reference value. For example, the machine-readable media can provide an instruction (e.g., command, etc.) to acquire data. In this regard, the machine-readable media is a non-transitory media and can include programmable logic that defines the frequency of acquisition of the data (or, transmission of the data). The computer readable media can include code, which can be written in any programming language including, but not limited to, Java or the like and any conventional procedural programming languages, such as the "C" programming language or similar programming languages. The computer readable program code can be executed on one processor or multiple remote processors. In the latter scenario, the remote processors can be connected to each other through any type of network (e.g., CAN bus, etc.).

In another configuration, the error computation module 310, the error programmer module 312, the integrator module 314, and/or the output computation module 316 are embodied as hardware units, such as electronic control units. As such the error computation module 310, the error programmer module 312, the integrator module 314, and/or the output computation module 316 can be embodied as one or more circuitry components including, but not limited to, processing circuitry, network interfaces, peripheral devices, input devices, output devices, sensors, etc.

In some embodiments, the error computation module 310, the error programmer module 312, the integrator module 314, and/or the output computation module 316 can take the form of one or more analog circuits, electronic circuits (e.g., integrated circuits (IC), discrete circuits, system on a chip (SOCs) circuits, microcontrollers, etc.), telecommunication circuits, hybrid circuits, and any other type of "circuit." In this regard, the error computation module 310, the error programmer module 312, the integrator module 314, and/or the output computation module 316 can include any type of component for accomplishing or facilitating achievement of the operations described herein. For example, a circuit as described herein can include one or more transistors, logic gates (e.g., NAND, AND, NOR, OR, XOR, NOT, XNOR, etc.), resistors, multiplexers, registers, capacitors, inductors, diodes, wiring, and so on), and programmable hardware devices (e.g., field programmable gate arrays, programmable array logic, programmable logic devices or the like). The error computation module 310, the error programmer module 312, the integrator module 314, and/or the output computation module 316 can each include a processor and one or more memory devices for storing instructions that are executable by each of the processors. The one or more memory devices and processor(s) can have the same definition as provided herein with respect to the memory 304 and the processor 302.

In some hardware unit configurations, the error computation module 310, the error programmer module 312, the integrator module 314, and/or the output computation module 316 can be physically located in separate locations in the processing circuit 202. Alternatively, the error computation module 310, the error programmer module 312, the integrator module 314, and/or the output computation module 316 can be embodied in or within a single unit/housing of the processing circuit 202. In some embodiments, the error computation module 310, the error programmer module 312, the integrator module 314, and/or the output computation module 316 can be a hybrid of any device disclosed above, such as a specific purpose processor or task execution unit (e.g., configured to execute a micro node) with additional circuitry specifically configured to execute bandwidth calculations, frame analysis, or routing determinations.

The error computation module 310 is configured to calculate an airspeed error value ($V_{error}$) based on a received airspeed reference value and a received current airspeed value. In some embodiments, the error computation module 310 is configured to calculate an airspeed error value by subtracting the current airspeed value ($V_{cur}$) from the airspeed reference value ($V_{ref}$). The airspeed error value may be a positive number (i.e., a value greater than zero) with a corresponding magnitude. The airspeed error value may be a negative number (i.e., a value less than zero) with a corresponding magnitude (i.e., the absolute value). In this regard, a positive airspeed error value corresponds to a current airspeed that is below the airspeed reference, and a negative airspeed error value corresponds to a current airspeed that is above the airspeed reference.

In some embodiments, the airspeed reference value represents a desirable reference speed for a landing approach. In this regard, the airspeed reference value is shown to be received as a user input 318. In some embodiments, the airspeed reference value may be provided as a user input, for example, by a user or aircraft operator via the UI elements 104. In other embodiments (not shown), the airspeed reference value is calculated as described herein. For example, a flight management system may automatically calculate an airspeed reference value based on characteristics of the aircraft 208 (e.g., a weight of the aircraft 208, flap configuration, flight phase, etc.) and provide the calculated airspeed value to the error computation module 310. In some embodiments, an airspeed reference value is initially stored in a memory or database (e.g., in the aircraft data database 212) and the error computation module 310 is configured to receive the stored airspeed reference value from the database.

The current airspeed value represents the actual airspeed of the aircraft. The current airspeed value is shown to be received as a sensor input 308 from a sensor (e.g., one of the aircraft sensors 206) configured to determine a current airspeed. In some embodiments, the current airspeed value is received from the aircraft data database 212. In some embodiments, the current airspeed value is received from an external system via the communication system 204 as described herein.

The error programmer module 312 is configured to determine a programmed error value (P) based on a received airspeed error value. The programmed error value may be a positive number (i.e., a value greater than zero) with a corresponding magnitude and it may be a negative number (i.e., a value less than zero) with a corresponding magnitude (i.e., the absolute value of the programmed error value). In some embodiments, the error programmer module 312 is configured to determine the programmed error value as the airspeed error value.

In some embodiments, the error programmer module 312 is configured to determine the programmed error value using one or more look-up tables and/or a control law or formula. In some embodiments, the error programmer module 312 is configured to determine a non-linear and/or asymmetric programmed error value based on the sign and/or magnitude of the airspeed error value. In some embodiments, the error programmer module 312 can be configured to determine a higher programmed error for a positive airspeed error value than for a negative airspeed value, which enables the dynamic airspeed reference value to increment up faster than it increments down.

In an example embodiment, a received airspeed error value is a negative number with a magnitude (x). The error programmer module 312 may determine (e.g., using a look-up table or control law) a programmed error value having a magnitude ( ) based on the sign and magnitude of the received airspeed error value:

$$V_{error} = -x;$$

$$P(-x) = -M$$

In this example embodiment, if the received airspeed error were a positive number, rather than a negative number, and with the same magnitude (x), then the error programmer module 312 is configured to determine (e.g., using the same look-up table or control law) a programmed error value having a larger magnitude:

$$V_{error} = x;$$

$$P(x) = M*2$$

In this example embodiment, as shown above, P(x) is determined to have a magnitude equal to twice the value as P(-x). In regard, the error programmer module 312 can be configured to asymmetrically determine programmed error values that bias the magnitude of an airspeed error values towards a larger value when the airspeed error value is a positive number and bias the magnitude of an airspeed error value towards a smaller value when the airspeed error value is a negative number.

It should be understood that the error programmer module 312 may use any combination of look-up table values and/or formulae having any suitable output characteristic for determining the magnitude of the programmed error value. For example, the error programmer module 312 may determine the programmed error value in a non-linear manner, such as by exponentially increasing and/or decreasing a programmed error value as the magnitude of the airspeed error value increases. Referring to the above example embodiment, the error programmer module 312 may have been configured to determine a magnitude of P(x) to be $M^2$ for example. The error programmer module 312 may be configured to determine the programmed error value based on any type and number of input parameters, such as aircraft altitude, acceleration, wind conditions, throttle position, weight, etc. For example, the error programmer module 312 may select one of several look-up tables according to the weight and wind conditions of the aircraft, or any other suitable parameter. In some embodiments, the error programmer module 312 may be configured based on one or more user inputs as described herein.

In some embodiments, the error programmer module 312 is configured with a deadzone range. The deadzone range can correspond to a desirable range of airspeed error values such that the error programmer module 312 is configured to output a programmed error value of "0" when the received airspeed error value is within the deadzone range. In this regard, the deadzone range can facilitate stability of the adder value, which may be desirable in dynamic conditions of a landing approach. In some embodiments, the deadzone range of the error programmer module 312 may be set by the aircraft operator using the UI elements 104 as described herein.

The integrator module 314 is configured to determine an adder value based on a programmed error value received from the error programmer module 312. In some embodiments, the integrator module 314 is configured to perform an integration function, increasing the output (i.e., the adder value) when the received programmed error value is a positive value, and/or decreasing the output when the received programmed error value is a negative value. In this regard, the integrator module 314 may be configured to receive historical data from the aircraft data database 212, such as a timeseries of measured airspeed, to perform the integration function. In other embodiments, the integrator module 314 and/or other processing circuits (not shown) may be configured to use a proportion function, an integral function, and/or a derivative function to determine the adder value.

In some embodiments, the integrator module 314 is configured to receive a maximum adder threshold and a minimum adder threshold for determining the adder value. In some embodiments, the integrator module 314 is configured to receive the maximum adder threshold and the minimum adder threshold values as user inputs. In some embodiments (not shown), the integrator module 314 is configured to receive the maximum adder threshold and the minimum adder threshold values from a memory or database. For example, the maximum adder threshold and the minimum adder threshold values may be stored in the aircraft data database 212 as described herein. In this regard, the integrator module 314 may be configured to selectively retrieve the maximum adder threshold and the minimum adder threshold values from the aircraft data database 212.

The maximum adder threshold and minimum adder threshold values can correspond to upper and lower limits of the output, thereby placing bounds on the adder value output by the integrator module 314. In some embodiments, the minimum adder threshold value is preset (not shown) or set by an aircraft operator to a value of "0", preventing the integrator module 314 from outputting a negative adder value. In this regard, the minimum adder threshold prevents the output computation module 316 from subtracting from the airspeed error value. In some embodiments, the maximum adder threshold value is set to a positive value (e.g., between "0" and "10"). For example, the maximum adder threshold value can be set as desired to prevent the integrator module 314 from excessively increasing the airspeed reference value.

The output computation module 316 is configured to calculate a dynamic airspeed reference value. The output computation module 316 is shown to receive an airspeed error value from the error computation module 310 and an adder value from the integrator module 314. The output computation module 316 is configured to add the airspeed error value and the adder value to determine the dynamic airspeed reference value. The dynamic airspeed reference value can be provided as an output to an external system or processing circuit, for example via the communications interface 306. For example, the dynamic airspeed reference value can be sent to the control law that provides throttle commands to capture and track the airspeed reference by reducing the airspeed error to zero. This in effect, increases the actual airspeed reference used by the automatic throttle control, and prevents the airspeed from decreasing below the airspeed reference value in some embodiments.

Figure 4:
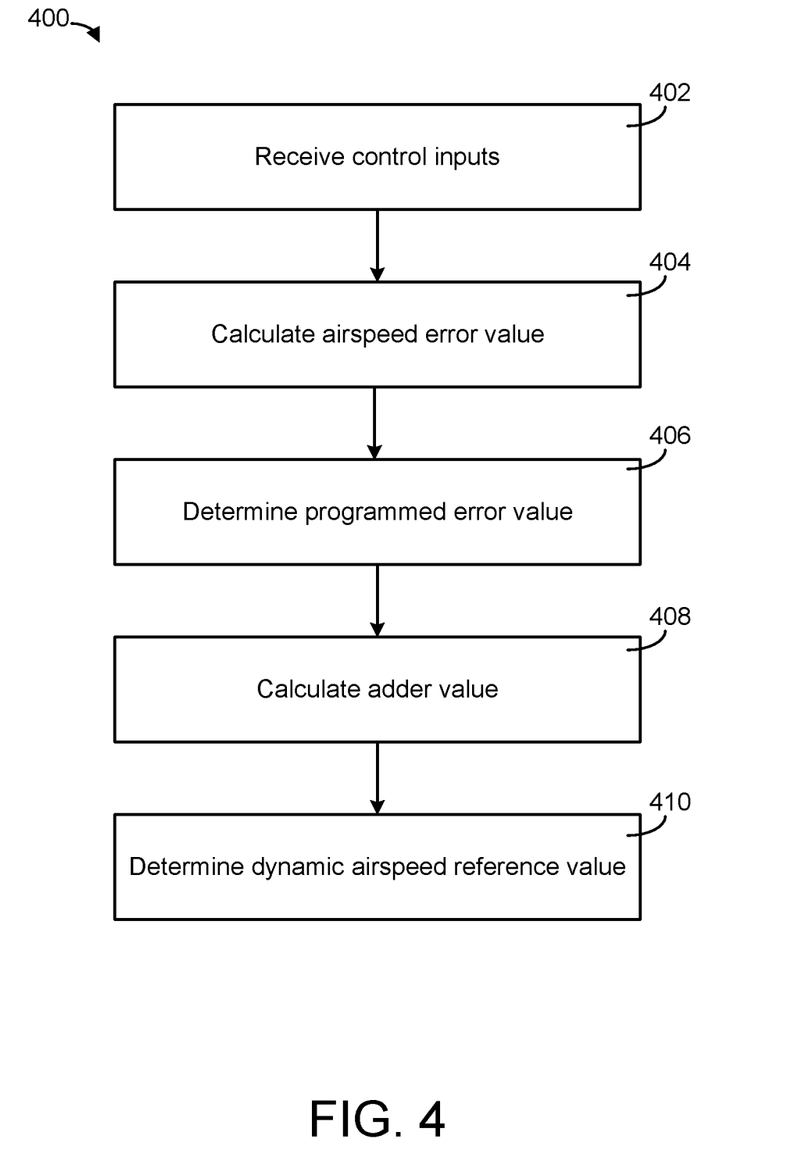
FIG. 4 is a flow diagram showing exemplary operations for determining a dynamic airspeed reference value by the system configured to determine the dynamic airspeed reference value illustrated in FIG. 2, according to the inventive concepts disclosed herein.

Referring now to FIG. 4, an operational flow 400 of determining a dynamic airspeed reference value is shown according to the inventive concepts disclosed herein. Although the embodiment described below describes the operational flow 400 as being performed by the processing circuit 202, in other embodiments the operational flow 400 may be performed using various hardware, apparatuses, and systems such as described herein.

At an operation 402, the processing circuit 202 receives control inputs. In some embodiments, the control inputs include a user input received from the UI elements 104. In some embodiments, the control inputs include information received from a memory or data storage (e.g., the aircraft data database 212). The control inputs can correspond to an airspeed reference value, a maximum adder threshold, and/or a minimum adder threshold. In some embodiments, the airspeed reference value is a desirable reference speed for a landing approach. In some embodiments, the processing circuit 202 is configured to calculate the airspeed reference value as described herein. In some embodiments, the control inputs include a sensor input received from the aircraft sensors 206. The sensor input can correspond to a current location and/or speed of an aircraft. In some embodiments, the control inputs include information received from the communication system 204, such as weather information and aircraft performance characteristics as described herein.

At an operation 404, the processing circuit 202 calculates an airspeed error value. The airspeed error value can be calculated by subtracting the current airspeed value from the airspeed reference value. In this regard, a positive airspeed error value corresponds to a current airspeed that is below the airspeed reference, and a negative airspeed error value corresponds to a current airspeed that is above the airspeed reference.

At an operation 406, the processing circuit 202 determines a programmed error value based on a received airspeed error value. The programmed error value may be a positive number (i.e., a value greater than zero) with a corresponding magnitude and it may be a negative number (i.e., a value less than zero) with a corresponding magnitude (i.e., the absolute value of the programmed error value). In some embodiments, the error programmer module 312 is configured to determine the programmed error value as the airspeed error value.

In some embodiments, the processing circuit 202 determines the programmed error value using one or more look-up tables and/or a control law or formula. In some embodiments, the processing circuit 202 determines a non-linear and/or asymmetric programmed error value based on the sign and/or magnitude of the airspeed error value as described herein. In some embodiments, the processing circuit 202 determines a higher programmed error for a positive airspeed error value than for a negative airspeed value as described herein, which enables the dynamic airspeed reference value to increment up faster than it increments down. In some embodiments, the processing circuit 202 asymmetrically determines programmed error values that bias the magnitude of an airspeed error value towards a larger value when the airspeed error value is a positive number and bias the magnitude of an airspeed error value towards a smaller value when the airspeed error value is a negative number.

It should be understood that any combination of look-up table values and/or formulae having any suitable output characteristic may be used for determining the magnitude of the programmed error value. For example, the processing circuit 202 determines the programmed error value in a non-linear manner, such as by exponentially increasing and/or decreasing a programmed error value as the magnitude of the airspeed error value increases. The processing circuit 202 may determine the programmed error value based on any type and number of input parameters, such as aircraft altitude, acceleration, wind conditions, throttle position, weight, etc. For example, the processing circuit 202 may select one of several look-up tables according to the weight and wind conditions of the aircraft, or any other suitable parameter. In some embodiments, the processing circuit 202 determines the programmed error based on one or more user inputs as described herein.

In some embodiments, the processing circuit 202 determines a programmed error value using a deadzone range. The deadzone range can correspond to a desirable range of airspeed error values such that a programmed error value is set to "0" when the received airspeed error value is within the deadzone range. In this regard, the deadzone range may facilitate stability of the adder value, which may be desirable in dynamic conditions of a landing approach. In some embodiments, the deadzone range may be set by the aircraft operator using the UI elements 104 as described herein.

At an operation 408, the processing circuit 202 calculates an adder value based on a programmed error value received from the error programmer module 312. In some embodiments, the processing circuit 202 calculates the adder value by performing an integration function, increasing the output (i.e., the adder value) when the received programmed error value is a positive value, and/or decreasing the output when the received programmed error value is a negative value. In this regard, the processing circuit 202 may receive historical data from the aircraft data database 212, such as a timeseries of measured airspeed, to perform the integration function. In other embodiments, the processing circuit 202 may use a proportion function, an integral function, and/or a derivative function for determining the dynamic airspeed reference value.

In some embodiments, the processing circuit 202 receives a maximum adder threshold and a minimum adder threshold for determining the adder value. In some embodiments, the processing circuit 202 receives the maximum adder threshold and the minimum adder threshold values from a memory or database. For example, the maximum adder threshold and the minimum adder threshold values may be stored in the aircraft data database 212 as described herein. In this regard, the maximum adder threshold and the minimum adder threshold values may be selectively retrieved from the aircraft data database 212. In some embodiments, the processing circuit 202 receives the maximum adder threshold and the minimum adder threshold values as a user input (e.g., via the UI elements 104).

The maximum adder threshold and minimum adder threshold values can correspond to upper and lower limits of the output, thereby placing bounds on the adder value. In some embodiments, the minimum adder threshold value is preset (not shown) or set by an aircraft operator to a value of "0", preventing a negative adder value. In this regard, the minimum adder threshold prevents the subtracting from the airspeed error value. In some embodiments, the maximum adder threshold value is set to a positive value (e.g., between "0" and "10"). For example the maximum adder threshold value can be set as desired to prevent excessively increasing the airspeed reference value.

At an operation 410, the processing circuit 202 determines a dynamic airspeed reference value. The output computation module 316 is configured to combine (e.g., add) the calculated airspeed error value (operation 404) and the calculated adder value (operation 408) to determine the dynamic airspeed reference value. The dynamic airspeed reference value can be provided as an output to an external system or processing circuit. For example, the dynamic airspeed reference value can be sent to the control law that provides throttle commands to capture and track the airspeed reference by reducing the airspeed error to zero. This in effect, increases the actual airspeed reference used by the automatic throttle control, and prevents the airspeed from decreasing below the airspeed reference value.

The scope of this disclosure should be determined by the claims, their legal equivalents and the fact that it fully encompasses other embodiments, which may become apparent to those skilled in the art. All structural, electrical and functional equivalents to the elements of the above-described disclosure that are known to those of ordinary skill in the art are expressly incorporated herein by reference and are intended to be encompassed by the present claims. A reference to an element in the singular is not intended to mean one and only one, unless explicitly so stated, but rather it should be construed to mean at least one. No claim element herein is to be construed under the provisions of 35 U.S.C. § 112, sixth paragraph, unless the element is expressly recited using the phrase "means for." Furthermore, no element, component or method step in the present disclosure is intended to be dedicated to the public, regardless of whether the element, component or method step is explicitly recited in the claims.

Embodiments of the inventive concepts disclosed herein have been described with reference to drawings. The drawings illustrate certain details of specific embodiments that implement the systems and methods and programs of the present disclosure. However, describing the embodiments with drawings should not be construed as imposing any limitations that may be present in the drawings. The present disclosure contemplates methods, systems and program products on any machine-readable media for accomplishing its operations. Embodiments of the inventive concepts disclosed herein may be implemented using an existing computer processor, or by a special purpose computer processor incorporated for this or another purpose or by a hardwired system.

Embodiments of the inventive concepts disclosed herein have been described in the general context of method steps which may be implemented in one embodiment by a program product including machine-executable instructions, such as program code, for example in the form of program modules executed by machines in networked environments. Generally, program modules include routines, programs, objects, components, data structures, etc. that perform particular tasks or implement particular abstract data types. Machine-executable instructions, associated data structures, and program modules represent examples of program code for executing steps of the methods disclosed herein. The particular sequence of such executable instructions or associated data structures represent examples of corresponding acts for implementing the functions described in such steps.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure.

The foregoing description of embodiments has been presented for purposes of illustration and description. It is not intended to be exhaustive or to limit the subject matter to the precise form disclosed, and modifications and variations are possible in light of the above teachings or may be acquired from practice of the subject matter disclosed herein. The embodiments were chosen and described in order to explain the principals of the disclosed subject matter and its practical application to enable one skilled in the art to utilize the disclosed subject matter in various embodiments and with various modifications as are suited to the particular use contemplated. Other substitutions, modifications, changes and omissions may be made in the design, operating conditions and arrangement of the embodiments without departing from the scope of the presently disclosed subject matter.

What is claimed is:

1. A method comprising:
    receiving, by a processing circuit, a control input comprising a current airspeed value, an airspeed reference value, a maximum adder threshold, and a minimum adder threshold, the current airspeed value measured at one or more repeating time intervals via a sensing device, the current airspeed value measured by the sensing device received at a predetermined frequency;
    transmit the current airspeed value measured by the sensing device to an aircraft data database configured to store the current airspeed value, the aircraft data database further configured to store a control law and a look-up table;
    calculating, by the processing circuit, an airspeed error value based on the control input;
    determining, by the processing circuit, a programmed error value based on a sign of the airspeed error value and a magnitude of the airspeed error value according to at least one of a look-up table or a control law, the determined programmed error value being zero when the calculated airspeed error value is within a predetermined deadzone range;
    calculating, by the processing circuit, an adder value by applying an integration function to the programmed error value according to at least one of the look-up table or the control law stored in the aircraft data database, the integration function configured to increase the adder value when the programmed error value is a positive value or configured to decrease the adder value when the programmed error value is a negative value;
    determining, by the processing circuit, a dynamic airspeed reference value based on the adder value, the dynamic airspeed reference value being related to a combination of the airspeed error value and the adder value; and
    where, by the processing circuit and the integration function, at least one of a proportion function, an integral function, or a derivative function transmit the dynamic airspeed reference value to the automatic throttling system of at least one of an unmanned or remotely piloted aircraft vehicle in order to maintain the aircraft velocity at the desired dynamic airspeed reference value.

2. The method of claim 1 wherein the processing circuit determines the programmed error value according to the look-up table and the dynamic airspeed reference value is equal to a sum of the airspeed error value and the adder value.

3. The method of claim 2 wherein the look-up table defines a first programmed error value and a second programmed error value based on the magnitude of the airspeed error value, wherein the first programmed error value corresponds to the airspeed error value being a positive number and the second programmed error value corresponds to the airspeed error value being a negative number, wherein an absolute value of the first programmed error value is larger than an absolute value of the second programmed error value.

4. The method of claim 1 wherein the programmed error value is zero when the airspeed error value is within a predetermined range.

5. The method of claim 1, wherein the processing circuit calculates the adder value by:
    calculating an initial adder value by applying the integration function to the programmed error value;
    when the initial adder value is below the minimum adder threshold, setting the adder value to a value corresponding to the minimum adder threshold;
    when the initial adder value is above the maximum adder threshold, setting the adder value to a value corresponding to the maximum adder threshold; and
    when the initial adder value is between the minimum adder threshold and the maximum adder threshold, setting the adder value as the initial adder value.

6. The method of claim 5 wherein the minimum adder threshold corresponds to a value of zero.

7. The method of claim 1 wherein the processing circuit calculates the airspeed error value by subtracting the current airspeed value from the airspeed reference value.

8. A system for an airborne platform, comprising:
a sensing device provided with the airborne platform and configured to measure a current airspeed at one or more repeating time intervals; an automatic throttling system;
an aircraft data database configured to store historical flight data, the aircraft data database further configured to store a control law and a look-up table; and
a processing circuit having a processor and a memory, the processing circuit communicably coupled to the sensing device, the aircraft data database, and to the automatic throttling system, the processing circuit configured to:
receive a control input comprising a current airspeed value measured by the sensing device, an airspeed reference value, a maximum adder threshold, and a minimum adder threshold, the current airspeed value measured by the sensing device received at a predetermined frequency;
transmit the current airspeed value measured by the sensing device to the aircraft data database to store with a time value;
calculate an airspeed error value based on the control input;
determine a programmed error value based on a sign of the calculated airspeed error value and a magnitude of the calculated airspeed error value according to at least one of the look-up table or the control law stored in the aircraft data database, the determined programmed error value being zero when the calculated airspeed error value is within a predetermined deadzone range;
calculate an adder value by applying an integration function to the determined programmed error value, the integration function configured to increase the adder value when the programmed error value is a positive value or configured to decrease the adder value when the programmed error value is a negative value;
determine a dynamic airspeed reference value based on the adder value, the dynamic airspeed reference value being calculated using the airspeed error value and the adder value; and
transmit the dynamic airspeed reference value to the automatic throttling system; and
where, by the processing circuit and the integration function, at least one of a proportion function, an integral function, or a derivative function transmit the dynamic airspeed reference value to the automatic throttling system of at least one of an unmanned or remotely piloted aircraft vehicle, in order to maintain the aircraft velocity at the desired dynamic airspeed reference value.

9. The system of claim 8 wherein the processing circuit is configured to determine the programmed error value according to the look-up table and the dynamic airspeed reference value is equal to a sum of the airspeed error value and the adder value.

10. The system of claim 9 wherein the look-up table defines a first programmed error value and a second programmed error value based on the magnitude of the calculated airspeed error value, wherein the first programmed error value corresponds to the calculated airspeed error value being a positive number and the second programmed error value corresponds to the calculated airspeed error value being a negative number, wherein an absolute value of the first programmed error value is larger than an absolute value of the second programmed error value.

11. The system of claim 8 wherein the processing circuit is configured to determine the programmed error value is zero when the calculated airspeed error value is within a predetermined range.

12. The system of claim 8, wherein the processing circuit is configured to calculate the adder value by:
calculating an initial adder value by applying the integration function to the determined programmed error value;
when the initial adder value is below the minimum adder threshold, setting the adder value to a value corresponding to the minimum adder threshold;
when the initial adder value is above the maximum adder threshold, setting the adder value to a value corresponding to the maximum adder threshold; and
when the initial adder value is between the minimum adder threshold and the maximum adder threshold, setting the adder value as the initial adder value.

13. The system of claim 12 wherein the minimum adder threshold corresponds to a value of zero.

14. The system of claim 8 wherein the processing circuit calculates the airspeed error value by subtracting the current airspeed value from the airspeed reference value.

15. A processing circuit of an aircraft, the processing circuit having a processor and a memory, and configured to:
receive a control input comprising a current airspeed value, an airspeed reference value, a maximum adder threshold, and a minimum adder threshold, the current airspeed value measured at one or more repeating time intervals via a sensing device, the current airspeed value measured by the sensing device received at a predetermined frequency;
transmit the current airspeed value measured by the sensing device to an aircraft data database configured to store the current airspeed value, the aircraft data database further configured to store a control law and a look-up table:
calculate an airspeed error value based on the control input;
determine a programmed error value based on a sign of the calculated airspeed error value and a magnitude of the calculated airspeed error value according to at least one of the look-up table or the control law stored in the aircraft data database, the determined programmed error value being zero when the calculated airspeed error value is within a predetermined deadzone range;
calculate an adder value by applying an integration function to the determined programmed error value, the integration function configured to increase the adder value when the programmed error value is a positive value or configured to decrease the adder value when the programmed error value is a negative value; and
determine a dynamic airspeed reference value based on the adder value, the dynamic airspeed reference value being equal to a sum of the airspeed error value and the adder value; and
where, by the processing circuit and the integration function, at least one of a proportion function, an integral function, or a derivative function transmit the dynamic airspeed reference value to the automatic throttling system of at least one of an unmanned or remotely piloted aircraft vehicle, in order to maintain the aircraft velocity at the desired dynamic airspeed reference value.

16. The processing circuit of claim 15 wherein the lookup table defines a first programmed error value and a second programmed error value based on the magnitude of the calculated airspeed error value, wherein the first programmed error value corresponds to the calculated airspeed error value being a positive number and the second programmed error value corresponds to the calculated airspeed error value being a negative number, wherein an absolute value of the first programmed error value is larger than an absolute value of the second programmed error value.

17. The processing circuit of claim 15 wherein the processing circuit is configured to determine the programmed error value is zero when the calculated airspeed error value is within a predetermined range.

18. The processing circuit of claim 15, wherein the processing circuit is configured to calculate the adder value by:
- calculating an initial adder value by applying the integration function to the determined programmed error value;
- when the initial adder value is below the minimum adder threshold, setting the adder value to a value corresponding to the minimum adder threshold;
- when the initial adder value is above the maximum adder threshold, setting the adder value to a value corresponding to the maximum adder threshold; and
- when the initial adder value is between the minimum adder threshold and the maximum adder threshold, setting the adder value as the initial adder value.

19. The processing circuit of claim 15 wherein the minimum adder threshold corresponds to a value of zero.

* * * * *